United States Patent
Wang et al.

(10) Patent No.: US 11,508,117 B1
(45) Date of Patent: Nov. 22, 2022

(54) EXTENDED REALITY SPACE GENERATING APPARATUS AND METHOD

(71) Applicant: INSTITUTE FOR INFORMATION INDUSTRY, Taipei (TW)

(72) Inventors: Shang-Ming Wang, Taipei (TW); Chi-Hsien Liu, Taipei (TW); Chien-Hsin Lee, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 0 days.

(21) Appl. No.: 17/455,922

(22) Filed: Nov. 22, 2021

(30) Foreign Application Priority Data

Oct. 27, 2021  (TW) .................................. 110139964

(51) Int. Cl.
  *G06T 15/20* (2011.01)
(52) U.S. Cl.
  CPC .................................. *G06T 15/20* (2013.01)
(58) Field of Classification Search
  None
  See application file for complete search history.

(56) References Cited

U.S. PATENT DOCUMENTS

| 2019/0285404 A1* | 9/2019 | Wohlfeld | G01B 11/2513 |
| 2020/0388044 A1* | 12/2020 | Cen | G06T 7/80 |
| 2021/0279950 A1* | 9/2021 | Phalak | G06V 10/40 |

OTHER PUBLICATIONS

Li, Lin, et al., "An improved RANSAC for 3D point cloud plane segmentation based on normal distribution transformation cells", Remote Sensing 9.5 (2017): 433 mdpi.com 2017, pp. 1-16.
The office action of the corresponding Taiwanese application No. TW110139964 dated Aug. 11, 2022.

* cited by examiner

*Primary Examiner* — Frank S Chen
(74) *Attorney, Agent, or Firm* — CKC & Partners Co., LLC (57) ABSTRACT

An extended reality space generating apparatus and method are provided. The extended reality space generating apparatus generates a plurality of plane plates, a plate coordinate and a normal vector corresponding to each of the plane plates based on a plurality of point clouds, wherein the point clouds correspond to a real space. The extended reality space generating apparatus compares the plate coordinates and the normal vectors of the plane plates in a visual window to generate an effective plane plate set. The extended reality space generating apparatus generates an extended reality space corresponding to the real space based on the effective plane plate set.

12 Claims, 5 Drawing Sheets

EXTENDED REALITY SPACE GENERATING APPARATUS AND METHOD

CROSS-REFERENCE TO RELATED APPLICATION

This application claims priority to Taiwan Application Serial Number 110139964, filed Oct. 27, 2021, which is herein incorporated by reference in its entirety.

BACKGROUND

Field of Invention

The present invention relates to an extended reality space generating apparatus and method. More particularly, the present invention relates to an apparatus and method for quickly generating an extended reality space based on a visual window.

Description of Related Art

In recent years, the technology related to point cloud has developed rapidly, and various applications have been proposed one after another. However, it is not easy for users to obtain visual spatial information from the point cloud information, and the virtual objects cannot be edited and overlapped in the virtual space intuitively. Therefore, a technology that can quickly generate an extended reality (XR) space is needed.

In the existing technology, it is usually necessary to use high-precision instruments such as depth cameras and infrared cameras to create a high-density and high-precision point clouds in a three-dimensional environment to directly scan a plane or object in the space to generate an extended reality space. However, the need for high-precision instruments and high-density and high-precision point clouds will cause the scanning and analysis processes to require a large amount of calculation, and thus the cost of building an extended reality space is relatively high. Therefore, the extended reality space cannot be generated in real time.

Accordingly, there is an urgent need for a technology that can quickly generate an extended reality space.

SUMMARY

An objective of the present invention is to provide an extended reality space generating apparatus. The extended reality space generating apparatus comprises a storage, a transceiver interface, and a processor, and the processor is electrically connected to the storage and the transceiver interface. The processor generates a plurality of plane plates, a plate coordinate and a normal vector corresponding to each of the plane plates based on a plurality of point clouds, wherein the point clouds correspond to a real space. The processor compares the plate coordinates with the normal vectors of the plane plates in a visual window to generate an effective plane plate set. The processor generates an extended reality space corresponding to the real space based on the effective plane plate set.

Another objective of the present invention is to provide an extended reality space generating method, which is adapted for use in an electronic apparatus. The electronic apparatus comprises a storage, a transceiver interface and a processor. The extended reality space generating method comprises following steps: generating a plurality of plane plates, a plate coordinate and a normal vector corresponding to each of the plane plates based on a plurality of point clouds, wherein the point clouds correspond to a real space; comparing the plate coordinates with the normal vectors of the plane plates in a visual window to generate an effective plane plate set; and generating an extended reality space corresponding to the real space based on the effective plane plate set.

According to the above descriptions, the extended reality space generating technology (at least including the apparatus and the method) provided by the present invention compares a plurality of plane plates generated by a plurality of point clouds through a comparison mechanism of a visual window. Therefore, the present invention can quickly determine whether other plane plates in the virtual space belong to the effective plane plate based on the known effective plane plates, and further based on the mechanism of rotating and moving the visual window, perform a complete and fast search for the effective plane plates in the virtual space. As a result, the extended reality space can be generated quickly. The present invention solves the disadvantages of the conventional technology that the extended reality space requires high-density and high-precision point clouds collected by high-precision instruments to construct a spatial plane or object. The present invention also solves the disadvantages that conventional technology consumes a lot of cost and time and cannot generate the extended reality space in real-time.

The detailed technology and preferred embodiments implemented for the subject invention are described in the following paragraphs accompanying the appended drawings for people skilled in this field to well appreciate the features of the claimed invention.

DETAILED DESCRIPTION

In the following description, an extended reality space generating apparatus and method according to the present invention will be explained with reference to embodiments thereof. However, these embodiments are not intended to limit the present invention to any environment, applications, or implementations described in these embodiments. Therefore, description of these embodiments is only for purpose of illustration rather than to limit the present invention. It shall be appreciated that, in the following embodiments and the attached drawings, elements unrelated to the present invention are omitted from depiction. In addition, dimensions of individual elements and dimensional relationships among individual elements in the attached drawings are provided only for illustration but not to limit the scope of the present invention.

Figure 1:
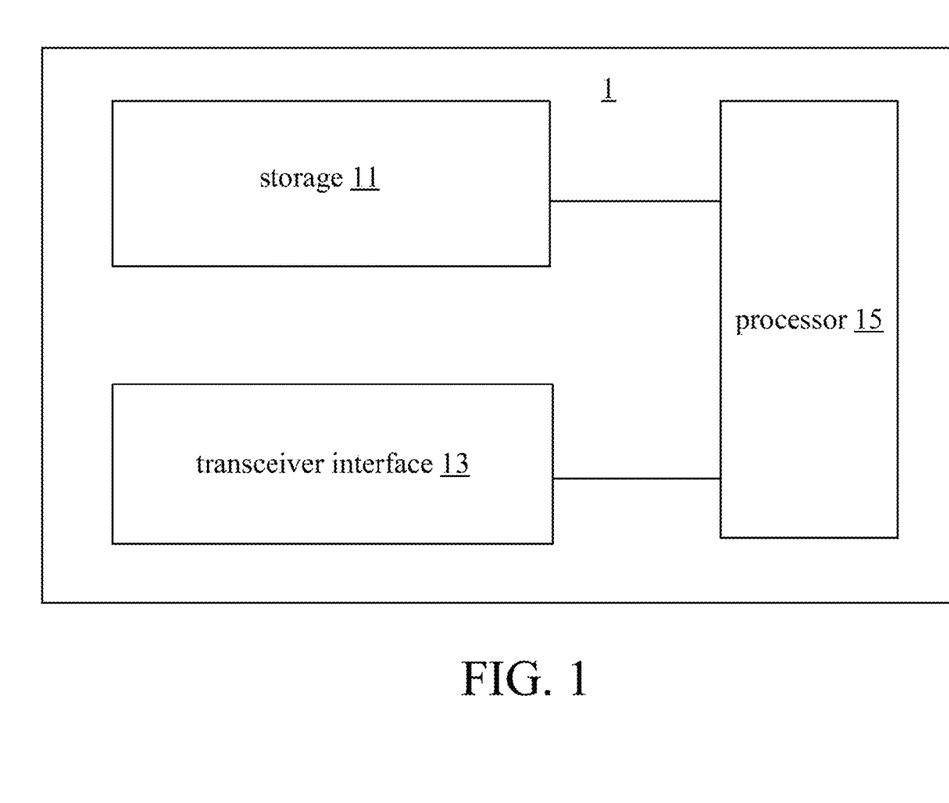
FIG. 1 is a schematic view depicting an extended reality space generating apparatus of the first embodiment.

A first embodiment of the present invention is an extended reality space generating apparatus 1 and a schematic view of which is depicted in FIG. 1. The extended reality space generating apparatus 1 includes a storage 11, a transceiver interface 13 and a processor 15, wherein the processor 15 is electrically connected to the storage 11 and the transceiver interface 13. The storage 11 may be a memory, a Universal Serial Bus (USB) disk, a hard disk, a Compact Disk (CD), a mobile disk, or any other storage medium or circuit known to those of ordinary skill in the art and having the same functionality. The transceiver interface 13 is an interface capable of receiving and transmitting data or other interfaces capable of receiving and transmitting data and known to those of ordinary skill in the art. The transceiver interface 13 can receive data from sources such as external apparatuses, external web pages, external applications, and so on. The processor 15 may be any of various processors, Central Processing Units (CPUs), microprocessors, digital signal processors or other computing apparatuses known to those of ordinary skill in the art.

In the present embodiment, the extended reality space generating apparatus 1 may use a plurality of point clouds to generate an extended reality (XR) space corresponding to the point clouds. It shall be appreciated that the point clouds are collected from a real space, and each of the point clouds corresponds to a spatial coordinate (for example, a three-dimensional space). In some embodiments, the point clouds can be generated by an external apparatus or by the extended reality space generating apparatus 1 itself.

Figure 2A:
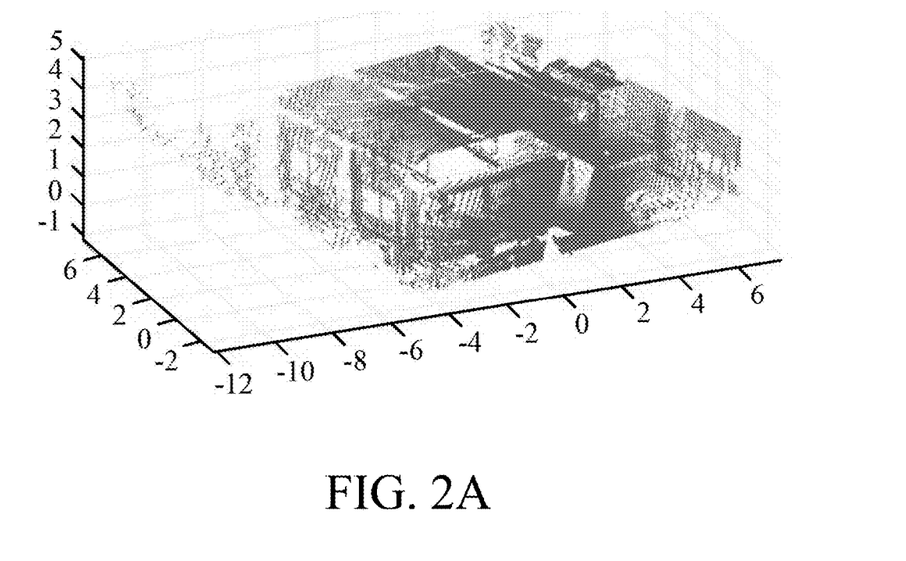
FIG. 2A is a schematic view depicting the multiple point clouds in the three-dimensional space of the first embodiment.

For example, a user can use an apparatus equipped with a depth camera (for example, a smart phone) to move the apparatus at a collection point or multiple collection points to scan the real space, so as to scan the real space for collecting the point clouds corresponding to the real space from various angles. For ease of understanding, FIG. 2A depicts a schematic view of a plurality of point clouds in a three-dimensional space.

It shall be appreciated that the present invention is different from the conventional technology that requires high-density and high-precision point clouds in the environment to scan planes or objects in space. The present invention does not limit the density and accuracy of the point clouds. One of the characteristics of the present invention is that even the point clouds are scattered, the point clouds can be used in the present invention as long as the point clouds have spatial coordinates.

Figure 3A:
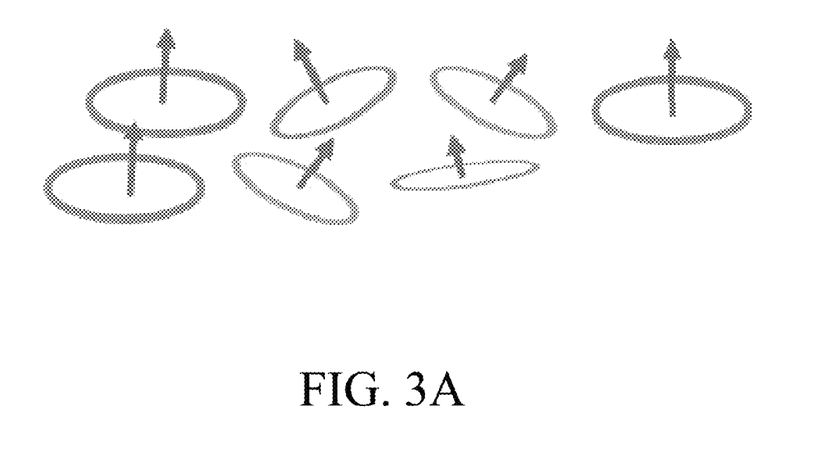
FIG. 3A is a schematic view depicting a plurality of circular plane plates with normal vectors of the first embodiment.

In the present embodiment, the processor 15 first executes a plane detection algorithm on the point clouds to generate a plurality of plane plates from the point clouds in the virtual space, wherein each of the plane plates corresponds to a plate coordinate and a normal vector. Specifically, the processor 15 generates a plurality of plane plates, a plate coordinate and a normal vector corresponding to each of the plane plates based on a plurality of point clouds, wherein the point clouds correspond to a real space. For example, as shown in FIG. 3A, FIG. 3A depicts a schematic view of the conversion of the point clouds into a plurality of circular plane plates with normal vectors, and each plane plate corresponds to a plate coordinate (e.g., the coordinates of the center of the circular plane plate in a three-dimensional space) and a direction vector (i.e., the normal vector).

Figure 2B:
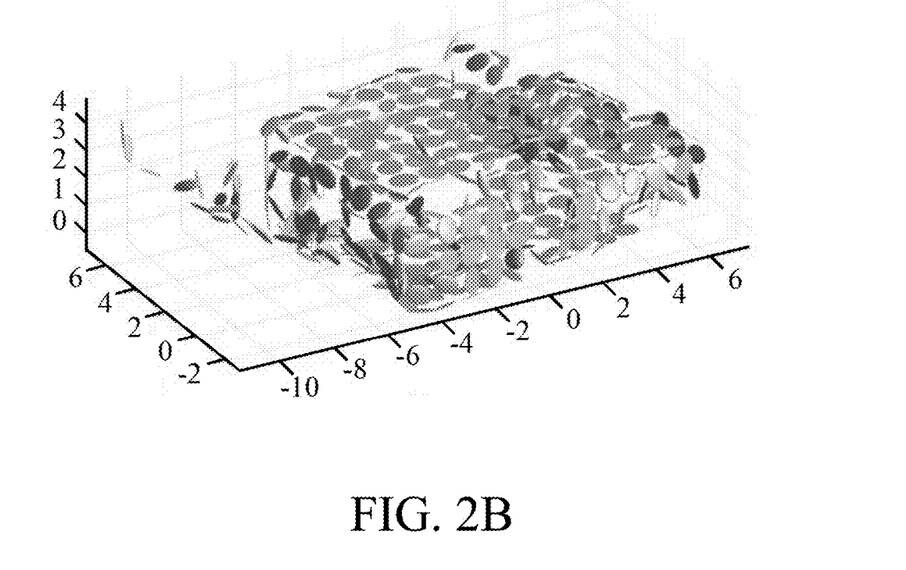
FIG. 2B is a schematic view depicting a plurality of plane plates of the first embodiment.

It shall be appreciated that the plane detection algorithm can use, for example, a random sampling consensus algorithm (RANSAC) to determine the point clouds belonging to the same plane based on the coordinates and area density of the point clouds, and produce a plurality of plane plates. For example, FIG. 2B depicts a schematic view of generating a plurality of plane plates based on the point clouds in FIG. 2A.

Then, in the subsequent operation, the processor 15 may determine whether each of the plane plates belongs to the effective plane plates, and add the effective plane plates to the effective plane plate set. Finally, the processor 15 generates an extended reality space corresponding to the real space based on the effective plane plate set.

It shall be appreciated that, in virtual space, because some adjacent plane plates may have different depths, directions, and even noise differences from each other, they should not be determined as actually continuous planes in real space (e.g., the combination of the two planes may produce abnormal gaps). Therefore, in order to quickly identify which plane plates can be used to generate the extended reality space, in the present embodiment, the processor 15 scans the plane plates in the virtual space through a visual window (e.g., a window emitted by a virtual camera at a position in the virtual space), and compares the differences between the plane plates in the visual window to determine whether each plane plate belongs to a effective plane plate (i.e., valid plane plate, which is used to generate the subsequent extended reality space) or invalid noise (i.e., the plane plate needs to be filtered out).

Specifically, the processor 15 compares the plate coordinates with the normal vectors of the plane plates in a visual window to generate an effective flat plate set. Finally, the processor 15 generates an extended reality space corresponding to the real space based on the effective plane plate set. It shall be appreciated that, in some embodiments, the initial effective plane plates may also be manually marked, or the processor 15 may determine a certain proportion of plane plates to be the initial effective plane plates.

In some embodiments, the processor 15 performs operation (a1), the processor 15 rotates the visual window based on a rotation angle value to make the visual window corresponds to a candidate plane plate and at least one first effective plane plate in the effective plane plate set. Next, the processor 15 performs operation (b1), the processor 15 compares the plate coordinates and the normal vectors of the candidate plane plate and the at least one first effective plane plate to determine whether to add the candidate plane plate to the effective plane plate set. Finally, the processor 15 performs operation (c1), the processor 15 executes the operation (a1) and the operation (b1) repeatedly until the operation (a1) no longer has the candidate plane that has not been compared.

In some embodiments, when the processor 15 determines whether to add the candidate plane plate to the effective plane plate set, the processor 15 further performs following operations: the processor 15 selects a second effective plane plate of the at least one first effective plane plate based on a distance between the candidate plane plate and the position after rotation (i.e., the distance from the virtual camera). Then, the processor 15 calculates an angle between the candidate plane plate and the second effective plane plate based on the normal vectors. Finally, the processor 15 adds the candidate plane plate to the effective plane plate set when determining that the angle between the candidate plane plate and the second effective plane plate is less than a preset value and the angle is less than the rotation angle value.

Figure 4A:
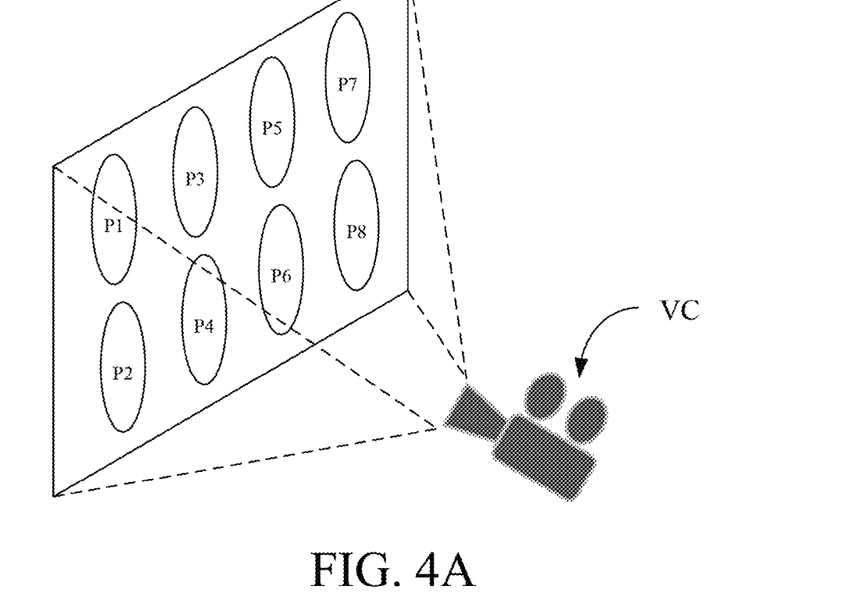
FIG. 4A is a schematic view depicting the projection of a visual window from a virtual camera in the first embodiment.

For ease of understanding, take a practical example as an example, please refer to FIG. 4A. FIG. 4A depicts a schematic view of projecting a visual window from a virtual camera VC. In FIG. 4A, the virtual camera VC projects the visual window from a position onto an initial plane. In this example, the initial plane already comprises a plurality of effective plane plates, and the visual window projected by the virtual camera VC comprises plane plates P1, P2, P3, P4, P5, P6, P7, and P8. Since the plane plates P1, P2, P3, P4, P5, P6, P7, and P8 have been determined to be the effective plane plates, the plane plates P1, P2, P3, P4, P5, P6, P7, and P8 have been added to the effective plane plate set.

In this example, the processor 15 calculates the distance between each plane plates in the visual window and the virtual camera VC, and marks the plane plates based on the distance. Therefore, it is convenient for subsequent operations to calculate the effective plane plates from the plane plates with the same distance. In some embodiments, the processor 15 can use a color to mark plane plates at different distances. Taking FIG. 4A as an example, the processor 15 can mark the closest plane plates P3 and P4 in red, the second closest plane plates P1, P2, P5, and P6 in yellow, and the farthest plane plates P7 and P8 in green.

For ease of description, the following descriptions are all illustrated in the form of color marking. Those of ordinary skill in the art shall appreciate the corresponding operations which are marked by other methods based on the foregoing descriptions. Therefore, the details will not be repeated herein.

Figure 4B:
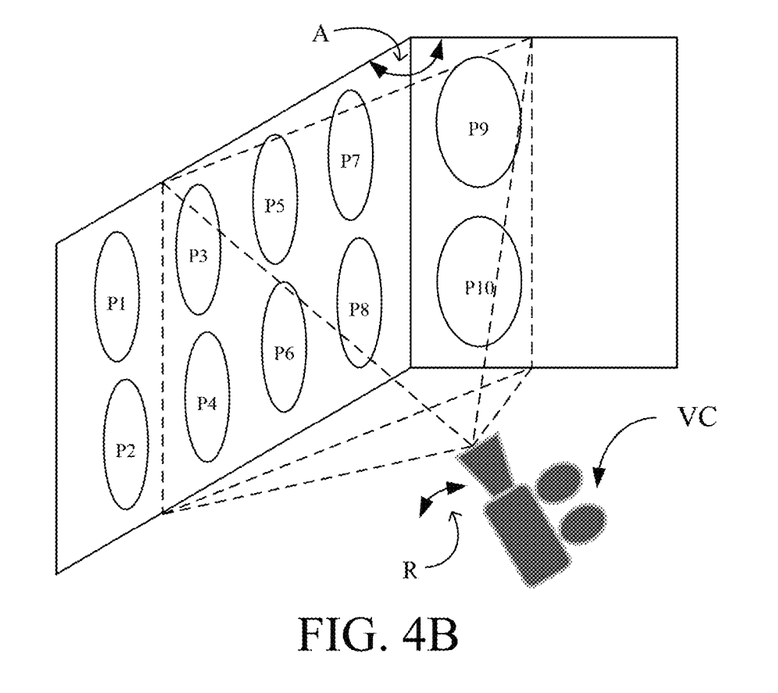
FIG. 4B is a schematic view depicting the rotation of the virtual camera of the first embodiment.

Next, the following paragraphs will explain the related determining operations of the effective plane plate that rotates the virtual camera VC with an angle, please refer to FIG. 4A and FIG. 4B at the same time. FIG. 4B depicts a schematic view of the rotating virtual camera VC. In FIG. 4B, the virtual camera VC is rotated by a rotation angle value R from its original position, and the moved visual window comprises plane plates P3, P4, P5, P6, P7, P8, P9, and P10. In this example, the new plane plates P9 and P10 that appear in the visual window after the movement are candidate plane plates (i.e., it is necessary to further determine whether they belong to the effective plane plates).

First, the processor 15 determines the distances between the plane plates P3, P4, P5, P6, P7, P8, P9, and P10 and the virtual camera VC, and marks the closest plane plates P7 and P8 in red, the second closest plane plates P5, P6, P9, and P10 in yellow, and the farthest plane plates P3 and P4 in green.

It shall be appreciated that since the candidate plane plates P9 and P10 that need to be determined are marked as yellow, the processor 15 determines whether the candidate plane plates P9 and P10 belong to the effective plane plates based on the plane plates P5 and P6 that are also marked as yellow (i.e., the effective plane plates with similar conditions are used as the benchmark to determine whether the candidate plane plates are the effective plane plates).

Next, the processor 15 calculates the angle A based on the normal vectors of the plane plates P5 and P6 and the normal vectors of the candidate plane plates P9 and P10. It shall be appreciated that if the angle A is too large, it means that the candidate plane plates P9 and P10 may contain too much noise content (i.e., the difference between the normal vectors are too large), and the candidate plane plates P9 and P10 are not suitable for being on the same plane as the plane plates P5 and P6. Therefore, the next stage of determination will be performed only when the angle A is less than a preset value.

Finally, the processor 15 compares the angle A with the rotation angle value R, and the candidate plane plates P9 and P10 are added to the effective plane plate set when the angle A is less than the rotation angle value R. It shall be appreciated that when the angle A is greater than the rotation angle value R, it also means that the candidate plane plates P9 and P10 may contain too much noise content (i.e., the difference between the normal vectors are too large), and the candidate plane plates P9 and P10 are not suitable for being on the same plane as the plane plates P5 and P6. Therefore, the candidate plane plates will be added to the effective plane plate set only when the angle A is less than the rotation angle value R.

It shall be appreciated that the processor 15 may continue to rotate the visual window based on the fixed or unfixed rotation angle value R to determine more candidate plane plates until there is no un-compared candidate plane plate.

Figure 3B:
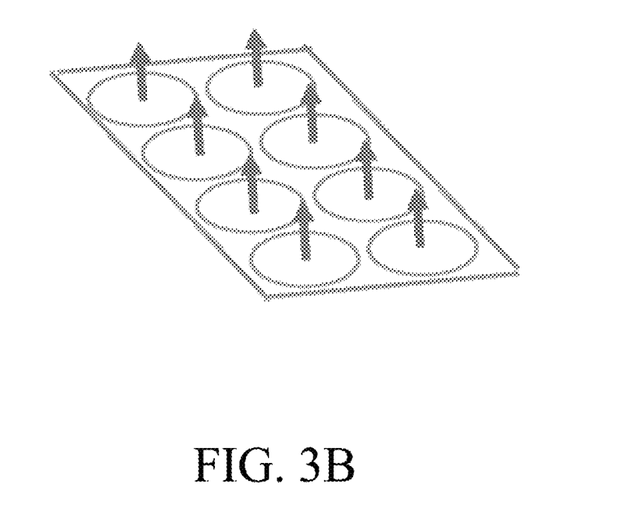
FIG. 3B is a schematic view depicting the initial plane of the first embodiment.

In some embodiments, the processor 15 can search for a plurality of better continuous plane plates as the initial plane (e.g., a plane composed of larger and continuous plane plates in FIG. 3B), select a position as the initial position from a direction perpendicular to the initial plane (i.e., the projection direction of the virtual camera VC is perpendicular to the initial plane) to facilitate subsequent determination of the effective plane plates. For example, the processor 15 can search for a plane with the most common or similar normal vectors based on the average vector position, slope, and size of each plane, as the initial plane.

Specifically, the processor 15 performs operation (a2), the processor 15 calculates the plate coordinates and the normal vectors of the plane plates to determine an initial plane, wherein the initial plane comprises a plurality of effective plane plates. Then, the processor 15 performs operation (b2), the processor 15 adds the effective plane plates to the effective plane plate set. Next, the processor 15 performs operation (c2), the processor 15 projects the visual window onto the initial plane from a position with a projection angle, wherein the visual window corresponds to the effective plane plates on the initial plane, and the projection angle is orthogonal to the initial plane. Then, the processor 15 performs operation (d), the processor 15 changes the projection angle based on a rotation angle value to rotate the visual window, wherein the visual window corresponds to a candidate plane plate and at least one first effective plane plate in the effective plane plate set. Next, the processor 15 performs operation (e), the processor 15 compares the plate coordinates and the normal vectors of the candidate plane plate and the at least one first effective plane plate to determine whether to add the candidate plane plate to the effective plane plate set. Finally, the processor 15 performs operation (f), the processor 15 executes the operation (d) and the operation (e) repeatedly until the operation (d) no longer has the candidate plane that has not been compared.

In some embodiments, the processor 15 further performs following operations: (e2-1) selecting a second effective plane plate of the at least one first effective plane plate based on a distance between the candidate plane plate and the position after rotation; (e2-2) calculating an angle between the candidate plane plate and the second effective plane plate based on the normal vectors; and (e2-3) adding the candidate plane plate to the effective plane plate set when determining that the angle between the candidate plane plate and the second effective plane plate is less than a preset value and the angle is less than the rotation angle value.

In some embodiments, the processor 15 further performs a coordinate standardization on the plate coordinate of each of the plane plates according to a coordinate position of the initial plane. For example, the processor 15 may set the coordinates of the lower left corner of the initial plane as the initial origin (0, 0, 0), and convert the coordinates of other plane plates to the corresponding coordinates.

In some embodiments, in addition to the rotation of the visual window based on the rotation angle value R, the processor 15 can also change the initial position to move in the virtual space, and perform the aforementioned determination operations to make a more complete determination of the effective plane plates in virtual space. Specifically, the processor 15 further performs the following operations: (g) changing the position based on a displacement value; and; and (h) executing the operation (d) and the operation (e) repeatedly until the operation (d) no longer has the candidate plane plate that has not been compared.

According to the above descriptions, the extended reality space generating apparatus 1 provided by the present invention compares a plurality of plane plates generated by a plurality of point clouds through a comparison mechanism of a visual window. Therefore, the extended reality space generating apparatus 1 can quickly determine whether other plane plates in the virtual space belong to the effective plane plate based on the known effective plane plates, and further based on the mechanism of rotating and moving the visual window, perform a complete and fast search for the effective plane plates in the virtual space. As a result, the extended reality space can be generated quickly. The present invention solves the disadvantages of the conventional technology that the extended reality space requires high-density and high-precision point clouds collected by high-precision instruments to construct a spatial plane or object. The present invention also solves the disadvantages that conventional technology consumes a lot of cost and time and cannot generate the extended reality space in real-time.

Figure 5:
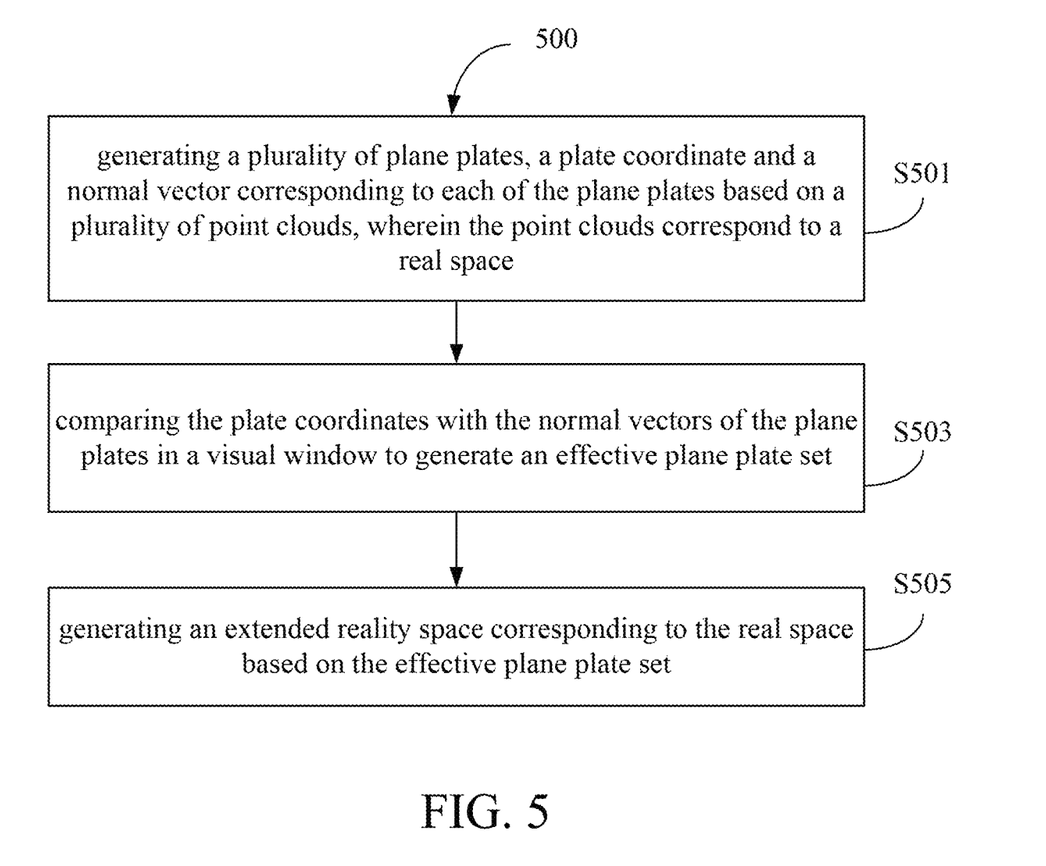
FIG. 5 is a partial flowchart depicting an extended reality space generating method of the second embodiment.

A second embodiment of the present invention is an extended reality space generating method and a flowchart thereof is depicted in FIG. 5. The extended reality space generating method 500 is adapted for an electronic apparatus (e.g., the extended reality space generating apparatus 1 of the first embodiment), and the electronic apparatus comprises a storage, a transceiver interface and a processor. The extended reality space generating method 500 generates the extended reality space through the steps S501 to S505.

In the step S501, the electronic apparatus generates a plurality of plane plates, a plate coordinate and a normal vector corresponding to each of the plane plates based on a plurality of point clouds, wherein the point clouds correspond to a real space. Next, in the step S503, the electronic apparatus compares the plate coordinates with the normal vectors of the plane plates in a visual window to generate an effective plane plate set. Finally, in the step S505, the electronic apparatus generates an extended reality space corresponding to the real space based on the effective plane plate set.

In some embodiments, the extended reality space generating method 500 further comprises following steps: (a1) rotating the visual window based on a rotation angle value to make the visual window corresponds to a candidate plane plate and at least one first effective plane plate in the effective plane plate set; (b1) comparing the plate coordinates and the normal vectors of the candidate plane plate and the at least one first effective plane plate to determine whether to add the candidate plane plate to the effective plane plate set; and (c1) executing the step (a1) and the step (b1) repeatedly until the step (a1) no longer has the candidate plane that has not been compared.

In some embodiments, the extended reality space generating method 500 further comprises following steps: (a2) calculating the plate coordinates and the normal vectors of the plane plates to determine an initial plane, wherein the initial plane comprises a plurality of effective plane plates; (b2) adding the effective plane plates to the effective plane plate set; (c2) projecting the visual window onto the initial plane from a position with a projection angle, wherein the visual window corresponds to the effective plane plates on the initial plane, and the projection angle is orthogonal to the initial plane; (d) changing the projection angle based on a rotation angle value to rotate the visual window, wherein the visual window corresponds to a candidate plane plate and at least one first effective plane plate in the effective plane plate set; (e) comparing the plate coordinates and the normal vectors of the candidate plane plate and the at least one first effective plane plate to determine whether to add the candidate plane plate to the effective plane plate set; and (f) executing the step (d) and the step (e) repeatedly until the step (d) no longer has the candidate plane plate that has not been compared.

In some embodiments, the extended reality space generating method 500 further comprises following steps: performing a coordinate standardization on the plate coordinate of each of the plane plates according to a coordinate position of the initial plane.

In some embodiments, the extended reality space generating method 500 further comprises following steps: (e2-1) selecting a second effective plane plate of the at least one first effective plane plate based on a distance between the candidate plane plate and the position after rotation; (e2-2) calculating an angle between the candidate plane plate and the second effective plane plate based on the normal vectors; and (e2-3) adding the candidate plane plate to the effective plane plate set when determining that the angle between the candidate plane plate and the second effective plane plate is less than a preset value and the angle is less than the rotation angle value.

In some embodiments, the extended reality space generating method 500 further comprises following steps: (g) changing the position based on a displacement value; and (h) executing the step (d) and the step (e) repeatedly until the step (d) no longer has the candidate plane plate that has not been compared.

In addition to the aforesaid steps, the second embodiment can also execute all the operations and steps of the extended reality space generating apparatus 1 set forth in the first embodiment, have the same functions, and deliver the same technical effects as the first embodiment. How the second embodiment executes these operations and steps, has the same functions, and delivers the same technical effects will be readily appreciated by those of ordinary skill in the art based on the explanation of the first embodiment. Therefore, the details will not be repeated herein.

It shall be appreciated that in the specification and the claims of the present invention, some words (e.g., the effective plane plate) are preceded by terms such as "first" or "second," and these terms of "first" and "second" are only used to distinguish these different words. For example, the "first" and "second" in the first effective plane plate and the second effective plane plate are only used to indicate the effective plane plate used in different stages.

According to the above descriptions, the extended reality space generating technology (at least including the apparatus and the method) provided by the present invention compares a plurality of plane plates generated by a plurality of point clouds through a comparison mechanism of a visual window. Therefore, the present invention can quickly determine whether other plane plates in the virtual space belong to the effective plane plate based on the known effective plane plates, and further based on the mechanism of rotating and moving the visual window, perform a complete and fast search for the effective plane plates in the virtual space. As a result, the extended reality space can be generated quickly. The present invention solves the disadvantages of the conventional technology that the extended reality space requires high-density and high-precision point clouds collected by high-precision instruments to construct a spatial plane or object. The present invention also solves the disadvantages that conventional technology consumes a lot of cost and time and cannot generate the extended reality space in real-time.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An extended reality space generating apparatus, comprising:
    a storage;
    a transceiver interface; and
    a processor, being electrically connected to the storage and the transceiver interface, and being configured to perform following operations:
        generating a plurality of plane plates, a plate coordinate and a normal vector corresponding to each of the plane plates based on a plurality of point clouds, wherein the point clouds correspond to a real space;
        comparing the plate coordinates with the normal vectors of the plane plates in a visual window to generate an effective plane plate set; and
        generating an extended reality space corresponding to the real space based on the effective plane plate set.

2. The extended reality space generating apparatus of claim 1, wherein the processor further performs following operations:
    (a1) rotating the visual window based on a rotation angle value to make the visual window corresponds to a candidate plane plate and at least one first effective plane plate in the effective plane plate set;
    (b1) comparing the plate coordinates and the normal vectors of the candidate plane plate and the at least one first effective plane plate to determine whether to add the candidate plane plate to the effective plane plate set; and
    (c1) executing the operation (a1) and the operation (b1) repeatedly until the operation (a1) no longer has the candidate plane that has not been compared.

3. The extended reality space generating apparatus of claim 1, wherein the processor further performs following operations:
    (a2) calculating the plate coordinates and the normal vectors of the plane plates to determine an initial plane, wherein the initial plane comprises a plurality of effective plane plates;
    (b2) adding the effective plane plates to the effective plane plate set;
    (c2) projecting the visual window onto the initial plane from a position with a projection angle, wherein the visual window corresponds to the effective plane plates on the initial plane, and the projection angle is orthogonal to the initial plane;
    (d) changing the projection angle based on a rotation angle value to rotate the visual window, wherein the visual window corresponds to a candidate plane plate and at least one first effective plane plate in the effective plane plate set;
    (e) comparing the plate coordinates and the normal vectors of the candidate plane plate and the at least one first effective plane plate to determine whether to add the candidate plane plate to the effective plane plate set; and
    (f) executing the operation (d) and the operation (e) repeatedly until the operation (d) no longer has the candidate plane plate that has not been compared.

4. The extended reality space generating apparatus of claim 3, wherein the processor further performs following operations:
    performing a coordinate standardization on the plate coordinate of each of the plane plates according to a coordinate position of the initial plane.

5. The extended reality space generating apparatus of claim 3, wherein the processor further performs following operations:
    (e2-1) selecting a second effective plane plate of the at least one first effective plane plate based on a distance between the candidate plane plate and the position after rotation;
    (e2-2) calculating an angle between the candidate plane plate and the second effective plane plate based on the normal vectors; and
    (e2-3) adding the candidate plane plate to the effective plane plate set when determining that the angle between the candidate plane plate and the second effective plane plate is less than a preset value and the angle is less than the rotation angle value.

6. The extended reality space generating apparatus of claim 3, wherein the processor further performs following operations:
    (g) changing the position based on a displacement value; and
    (h) executing the operation (d) and the operation (e) repeatedly until the operation (d) no longer has the candidate plane plate that has not been compared.

7. An extended reality space generating method, being adapted for use in an electronic apparatus, comprising a storage, a transceiver interface and a processor, and the extended reality space generating method comprising following steps:
    generating a plurality of plane plates, a plate coordinate and a normal vector corresponding to each of the plane plates based on a plurality of point clouds, wherein the point clouds correspond to a real space;
    comparing the plate coordinates with the normal vectors of the plane plates in a visual window to generate an effective plane plate set; and
    generating an extended reality space corresponding to the real space based on the effective plane plate set.

8. The extended reality space generating method of claim 7, wherein the extended reality space generating method further comprises following steps:
- (a1) rotating the visual window based on a rotation angle value to make the visual window corresponds to a candidate plane plate and at least one first effective plane plate in the effective plane plate set;
- (b1) comparing the plate coordinates and the normal vectors of the candidate plane plate and the at least one first effective plane plate to determine whether to add the candidate plane plate to the effective plane plate set; and
- (c1) executing the step (a1) and the step (b1) repeatedly until the step (a1) no longer has the candidate plane that has not been compared.

9. The extended reality space generating method of claim 7, wherein the extended reality space generating method further comprises following steps:
- (a2) calculating the plate coordinates and the normal vectors of the plane plates to determine an initial plane, wherein the initial plane comprises a plurality of effective plane plates;
- (b2) adding the effective plane plates to the effective plane plate set;
- (c2) projecting the visual window onto the initial plane from a position with a projection angle, wherein the visual window corresponds to the effective plane plates on the initial plane, and the projection angle is orthogonal to the initial plane;
- (d) changing the projection angle based on a rotation angle value to rotate the visual window, wherein the visual window corresponds to a candidate plane plate and at least one first effective plane plate in the effective plane plate set;
- (e) comparing the plate coordinates and the normal vectors of the candidate plane plate and the at least one first effective plane plate to determine whether to add the candidate plane plate to the effective plane plate set; and
- (f) executing the step (d) and the step (e) repeatedly until the step (d) no longer has the candidate plane plate that has not been compared.

10. The extended reality space generating method of claim 9, wherein the extended reality space generating method further comprises following steps:
performing a coordinate standardization on the plate coordinate of each of the plane plates according to a coordinate position of the initial plane.

11. The extended reality space generating method of claim 9, wherein the extended reality space generating method further comprises following steps:
- (e2-1) selecting a second effective plane plate of the at least one first effective plane plate based on a distance between the candidate plane plate and the position after rotation;
- (e2-2) calculating an angle between the candidate plane plate and the second effective plane plate based on the normal vectors; and
- (e2-3) adding the candidate plane plate to the effective plane plate set when determining that the angle between the candidate plane plate and the second effective plane plate is less than a preset value and the angle is less than the rotation angle value.

12. The extended reality space generating method of claim 9, wherein the extended reality space generating method further comprises following steps:
- (g) changing the position based on a displacement value; and
- (h) executing the step (d) and the step (e) repeatedly until the step (d) no longer has the candidate plane plate that has not been compared.

* * * * *